United States Patent [19]

Terashima et al.

[11] Patent Number: 5,294,367
[45] Date of Patent: Mar. 15, 1994

[54] FERROELECTRIC LIQUID CRYSTAL COMPOSITION AND LIGHT SWITCHING ELEMENT COMPRISING THE SAME

[75] Inventors: Kanetsugu Terashima, Ichihara; Makoto Kikuchi, Kisarazu; Katsuyuki Murashiro, Ichihara, all of Japan

[73] Assignee: Chisso Corporation, Japan

[21] Appl. No.: 881,719

[22] Filed: May 12, 1992

Related U.S. Application Data

[63] Continuation of Ser. No. 505,154, Apr. 5, 1990, Pat. No. 5,188,761.

[30] Foreign Application Priority Data

Apr. 7, 1989 [JP] Japan .................. 1-86715

[51] Int. Cl.$^5$ .................. C09K 19/34; C09K 19/12; C09K 19/20; G02F 1/13
[52] U.S. Cl. .................. 252/299.61; 252/299.66; 252/299.67; 252/299.65
[58] Field of Search .................. 252/299.61, 299.65, 252/299.66; 359/103

[56] References Cited

U.S. PATENT DOCUMENTS

4,963,288 10/1990 Saito et al. .................. 252/299.61
5,188,761 2/1993 Terashima et al. .......... 252/299.61

Primary Examiner—Robert L. Stoll
Assistant Examiner—C. Harris
Attorney, Agent, or Firm—Leydig, Voit & Mayer

[57] ABSTRACT

A ferroelectric liquid crystal composition is provided exhibiting an Sc* phase over a wide temperature range including room temperature and having a spontaneous polarization value of 30 nC/cm$^2$ or less and a quick response, time. An optical switching element comprising the ferroelectric liquid crystal composition is also provided. The ferroelectric liquid crystal composition comprises components A, B, C and D in respective amounts by weight of 75 to 95%, 3 to 9%, and 3 to 12% and 2 to 5% based on the total amount of these components and having a phase sequence series of an isotropic liquid, a cholesteric phase, a smectic A phase and a chiral smectic C phase in that order from the high temperature side and a spontaneous polarization value of 30 nC/cm$^2$ or less.

The component A is at least one compound selected from the group consisting of compounds represented by the general formulae:

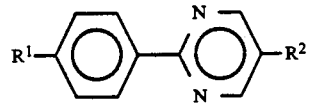

and

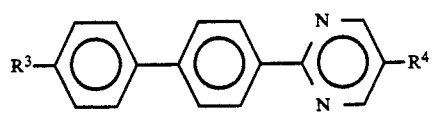

The component B is at least one compound selected from the group consisting of compounds represented by the general formulae:

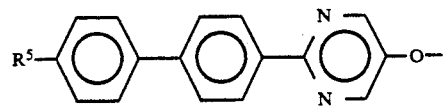

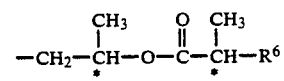

and

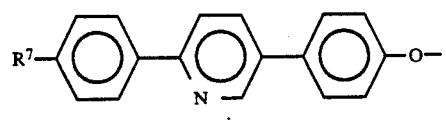

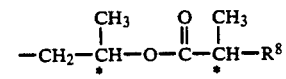

(List continued on next page.)

The component C is at least one compound selected from the group consisting of compounds represented by the general formula:
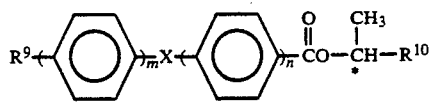
In the above formulae, $R^1$ to $R^{10}$, X, m, n and * are as defined in the claims.
19 Claims, No Drawings

FERROELECTRIC LIQUID CRYSTAL COMPOSITION AND LIGHT SWITCHING ELEMENT COMPRISING THE SAME

This application is a continuation of application Ser. No. 07/505,154, filed Apr. 5, 1990 U.S. Pat. No. 5,188,761.

BACKGROUND OF THE INVENTION

1. Field of the Invention

The present invention relates to a ferroelectric liquid crystal material. More particularly, the present invention is concerned with a ferroelectric liquid crystal composition having a quick response despite its small spontaneous polarization value which comprises a non-chiral smectic liquid crystal compound and an optically active compound, and an optical switching element comprising the same.

2. Description of the Prior Art

Liquid crystal compounds are widely used as a material for display devices. Most of these display devices are used in a TN-type display system, and liquid crystal materials belonging to a nematic phase are used for this purpose.

Since the TN-type display system is a non emissive display type, it has advantages such as freedom from occurrence of eyestrain and very low power consumption, but on the other hand it has drawbacks such as slow response and difficulty in viewing of display depending upon viewing angle. In recent years, this type of system has been converted in such a manner that features in the form of a flat display could be utilized. In particular, quick response and wide viewing angle have been demanded.

In order to meet the above demand, an attempt has been made to improve the liquid crystal material. However, the TN display system is considerably inferior to other emissive types of display (e.g., electroluminescent display, plasma display, etc.) in response time and width of viewing angle.

Therefore, development of a novel liquid display system as an alternative to the TN type display system is indispensable to attain a combination of utilization of the features of a liquid crystal display device, such as non-emissive display type and low power consumption, with attainment of response characteristics comparable to those of the emissive display. As one of such attempts, N. A. Clark and S. T. Lagerwall have proposed a display system wherein an optical switching phenomenon of a ferroelectric liquid crystal is utilized [see Appl. Phys. Lett., Vol. 36, p. 899 (1980)].

The existence of ferroelectric liquid crystals has been first published in 1975 by R. B. Mayer [see J. Phys., Vol. 36, p. 69 (1975), and these ferroelectric liquid crystals belong respectively to a chiral smectic C phase, a chiral smectic I phase, a chiral smectic F phase, a chiral smectic G phase, a chiral smectic H phase, a chiral smectic J phase, and a chiral smectic K phase (hereinafter simply referred to as "$S_C^*$ phase", "$S_I^*$ phase", "$S_F^*$ phase", "$S_G^*$ phase", "$S_H^*$ phase", "$S_J^*$ phase" and "$S_K^*$ phase", respectively) from the viewpoint of the structure of the liquid crystal.

When the optical switching phenomenon of the ferroelectric liquid crystal is applied as a display device, it exhibits two features superior to those of the TN-type display system. The first feature is its very quick response, and the response speed is one thousand to ten thousands higher than that of the TN-type display system. The second feature is the memory effect, and this facilitates multiplexing drive through cooperation with the above-described quick response.

Particular attention is now focused on the $S_C^*$ phase among the chiral smectic phases.

When the ferroelectric liquid crystal is applied to a display device, it should meet the following requirements.

(1) It should exhibit an $S_C^*$ phase over a wide temperature range including room temperature (at least 0 to 50° C.).

(2) A response time of 100 μsec or less is required for a display device of 640×400 lines or more.

The response time ($\tau$) to the electric field of the ferroelectric liquid crystal is expressed by the following equation:

$$\tau = \frac{\eta}{P_s \cdot E}$$

wherein $\eta$ is the viscosity, Ps is the spontaneous polarization and E is the electric field strength. For this reason, in order to realize a quick response, it is necessary to have a large spontaneous polarization value.

However, in recent years, occurrence of abnormal phenomena accompanying the large spontaneous polarization value has been reported (see, for example, Akio Yoshida et al., The 13th Symposium on Liquid Crystals, 142-143 (1987); J. Dijon et al., SID 88 DIGEST, 246-249 (1988); or H. R. Dübal et al, Jpn. J. Appl. Phys., 27 (1988) L2241-L2244). According to these reports, when a commercially available polyimide film is used as an insulating layer, the spontaneous polarization value should be 30 nC/cm² or less, preferably 25 nC/cm² or less.

(3) According to N. A. Clark, in order to attain the memory effect, a helix should be unwound by making the value of a cell gap (d) smaller than the pitch value (P) of the helix (see Appl. Phys. Lett., 36, 899 (1980)). For this reason, it is necessary to lengthen the pitch of the helix of the ferroelectric liquid crystal for the purpose of enabling the use of a cell having a large thickness cell gap which can be easily prepared.

(4) The oriented state of a ferroelectric liquid crystal varies depending upon the phase series of the liquid crystal. At the present time, it is considered that a liquid crystal having a smectic A phase and a cholesteric phase (hereinafter simply referred to as "$S_A$ phase" and "$N^*$ phase", respectively) on the high temperature side of an $S_C^*$ phase exhibits the best oriented state through aligning techniques (surface treatment processes) currently used in the TN liquid crystal material. In other words, it is desired that the ferroelectric liquid crystal have the following phase series: isotropic liquid (hereinafter simply referred to "Iso")→$N^*$→$S_A$→$S_C^*$ (see, for example, Japanese Patent Application Laid-Open No. 250086/1986).

Further, it is considered that among the liquid crystal materials having the above-described phase series, those having a larger pitch value in the $N^*$ phase exhibit a better oriented state (see, for example, Japanese Patent Application Laid-Open No. 255323/1986).

Besides the above-described requirements, there are various requirements such as tilt angle ($\theta$) of the liquid crystal molecule.

Even when only the temperature range is taken up, only a few ferroelectric liquid materials can be put to practical use. Therefore, at the present time, there are few ferroelectric liquid materials which can meet all the above-described requirements and can be put to practical use.

For example, Japanese Patent Application Laid-Open No. 291679/1986 and a pamphlet of PCT International Publication No. W0 86/06401 each disclose a ferroelectric liquid crystal comprising a mixture of a non-chiral phenyl pyrimidine compound having a smectic C phase (hereinafter simply referred to as "$S_C$ phase") with an optically active compound and describe that this ferroelectric liquid material exhibits an $S_C*$ phase over a wide temperature range including room temperature and has the phase series Iso→N*→$S_A$→$S_C*$ and has a spontaneous polarization value of 30 $nC/cm^2$ or less. Although the ferroelectric liquid crystal composition described in the above-described publications satisfies the above-described requirements in respect of the temperature range of the $S_C*$ phase, phase series and spontaneous polarization value, it cannot be put to practical use because the response time is 300 to 500 μsec (see, for example, ferroelectric liquid crystal compositions described in Examples 1 and 2 of Japanese Patent Application Laid-Open No. 29167/1986 or ferroelectric liquid crystal compositions described in Examples 45 and 46 of the pamphlet of PCT International Publication No. W0 86/06401).

Japanese Patent Application Laid-Open No. 541/1988 discloses a ferroelectric liquid crystal composition comprising a mixture of a non-chiral phenyl pyrimidine compound with an optically active compound represented by the general formula (III), (IV) or (V) of the present invention and describes that this ferroelectric liquid crystal composition exhibits an $S_C*$ phase over a wide temperature range including room temperature and has a response speed as high as 100 μsec or less. Although the ferroelectric liquid crystal composition disclosed in the the above-described patent application satisfies the above-described requirements with regard to the temperature range of the $S_C*$ phase and response time, it cannot be put to practical use due to the difficulty in attaining the excellent orientation attributable to the absence of an N* phase (see, for example, Examples 1, 3 and 5), and occurrence of an abnormal phenomenon when a switching operation is conducted attributable to a spontaneous polarization value of 30 $nC/cm^2$ or more (see, for example, Example 2).

As is apparent from the foregoing description, at the present time, there are few ferroelectric liquid crystal materials which can satisfy all the above-described requirements and can be immediately applied to a display device.

SUMMARY OF THE INVENTION

The first object of the present invention is to provide a ferroelectric liquid crystal composition which exhibits an $S_C*$ phase over a wide temperature range including room temperature and has a spontaneous polarization value of 30 $nC/cm^2$ or less and a quick response, i.e., a response time of 100 μsec or less.

The second object of the present invention is to provide an optical switching element having a quick response which comprises said such liquid crystal composition.

The present inventors have made extensive and intensive studies with a view to solving the above-described problems. As a result, they have found that, as will be described below, a combination of a non-chiral phenyl pyrimidine compound with an optically active compound having a high spontaneous polarization value, the same polarity and an oppositely twisted helix enables preparation of a ferroelectric liquid crystal composition which exhibits an $S_C*$ phase over a wide temperature range including room temperature and easily attains excellent orientation and has a spontaneous polarization value of 30 $nC/cm^2$ or less and a quick response, i.e., a response time of 100 μsec or less, which has led to the completion of the present invention.

According to the first aspect of the present invention, there is provided the following ferroelectric liquid crystal compositions.

(1) A ferroelectric liquid crystal composition comprising three components A, B and C in respective amounts of 75 to 95% by weight, 3 to 9% by weight and 3 to 12% by weight based on the total amount of the components A, B and C and having a phase sequence series of an isotropic liquid, a cholesteric phase, a smectic A phase and a chiral smectic C phase proceeding in that order from the high temperature side and a spontaneous polarization value of 30 $nC/cm^2$ or less, said component A being at least one compound selected from the group consisting of compounds represented by the general formula (I):

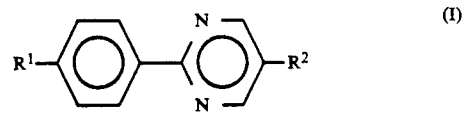

wherein $R^1$ and $R^2$ which may be the same or different are each a straight-chain or branched alkyl, alkoxy or alkanoyloxy group having 1 to 18 carbon atoms, and compounds represented by the general formula (II):

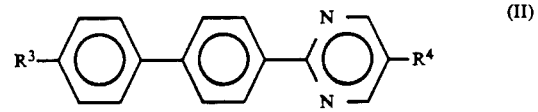

wherein $R^3$ and $R^4$ which may be the same or different are each a straight-chain or branched alkyl or alkoxy group having 1 to 18 carbon atoms, said component B being at least one compound selected from the group consisting of compounds represented by the general formula (III):

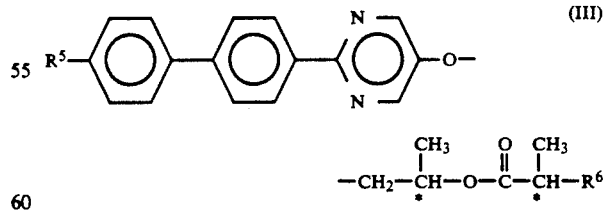

wherein $R^5$ is a straight-chain or branched alkyl or alkoxy group having 1 to 18 carbon atoms, $R^6$ is a straight-chain or branched alkyl group having 2 to 18 carbon atoms or a straight-chain or branched alkoxy group having 1 to 18 carbon atoms and * represents an asymmetric carbon atom, and compounds represented by the general formula (IV):

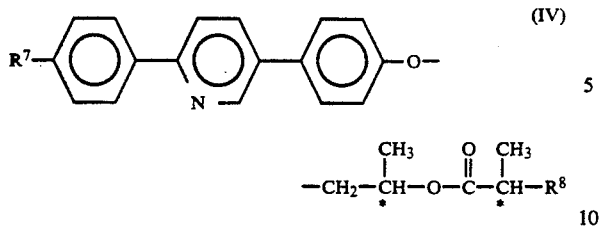

(IV)

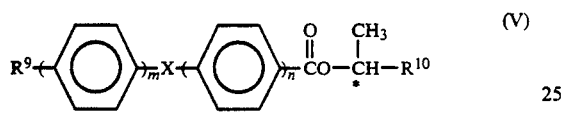

wherein R⁷ is a straight-chain or branched alkyl or alkoxy group having 1 to 18 carbon atoms, R⁸ is a straight-chain or branched alkyl group having 2 to 18 carbon atoms or a straight-chain or branched alkoxy group having 1 to 18 carbon atoms and * represents an asymmetric carbon atom, said component C being at least one compound selected from the group consisting of compounds represented by the general formula (V):

$$R^9\text{-}\!\!\left(\!\bigcirc\!\right)_{\!m}\!\!-X\!-\!\!\left(\!\bigcirc\!\right)_{\!n}\!\!-\overset{O}{\overset{\|}{C}}O-\overset{CH_3}{\underset{*}{C}H}-R^{10}$$ (V)

wherein R⁹ is a straight-chain or branched alkyl or alkoxy group having 1 to 18 carbon atoms, R¹⁰ is a straight-chain or branched alkyl group having 2 to 18 carbon atoms, X is —OCH₂— or —CH₂O—, m and n are each 1 or 2, provided that m+n=3 and * represents an asymmetric carbon atom.

(2) A ferroelectric liquid crystal composition according to the above-described item (1), wherein said component A is at least one compound selected from the group consisting of compounds represented by the general formula (I) wherein R¹ is a straight-chain alkoxy or alkanoyloxy group having 5 to 12 carbon atoms and R² is a straight-chain alkyl group having 7 to 11 carbon atoms; and compounds represented by the general formula (II) wherein R³ is a straight-chain alkyl or alkoxy group having 5 to 10 carbon atoms and R⁴ is a straight-chain alkyl group having 6 to 10 carbon atoms.

(3) A ferroelectric liquid crystal composition according to the above-described item (1), wherein said component B is at least one compound selected from the group consisting of compounds represented by the general formula (III) wherein R⁵ is a straight-chain alkyl or alkoxy group having 3 to 10 carbon atoms, R⁶ is a straight-chain alkyl or alkoxy group having 2 to 10 carbon atoms; and compounds represented by the general formula (IV) wherein R⁷ is a straight-chain alkyl or alkoxy group having 3 to 10 carbon atoms and R⁸ is a straight-chain alkyl or alkoxy group having 2 to 10 carbon atoms.

(4) A ferroelectric liquid crystal composition according to the above-described item (1), wherein said component C is at least one compound selected from the group consisting of compounds represented by the general formula (V) wherein R⁹ is a straight-chain alkyl or alkoxy group having 6 to 12 carbon atoms and R¹⁰ is a straight-chain alkyl group having 2 to 10 carbon atoms.

(5) A ferroelectric liquid crystal composition according to the above-described item (1), wherein said component A is at least one compound selected from the group consisting of the following compounds:

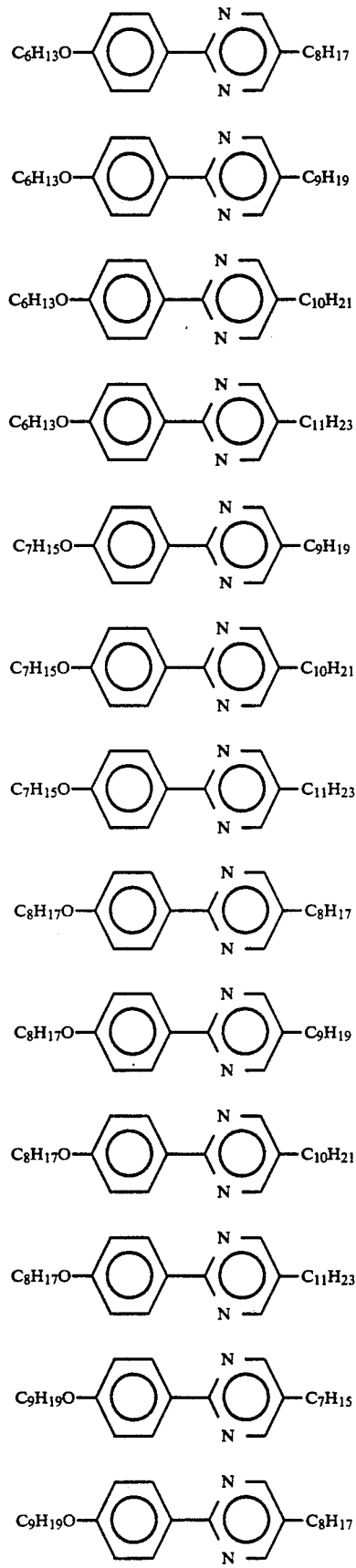

-continued

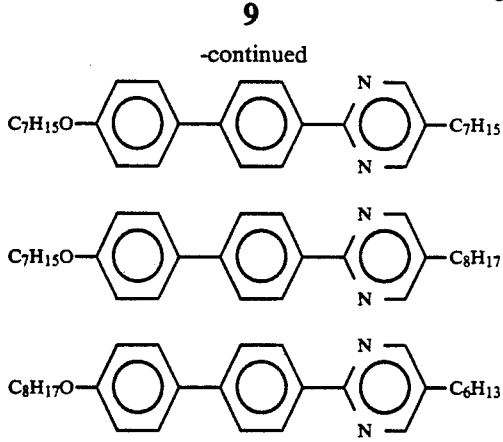
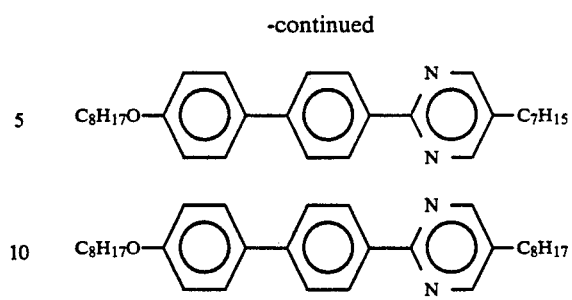
(6) A ferroelectric liquid crystal composition according to the above-described item (1), wherein said component B is at least one compound selected from the group consisting of the following compounds:
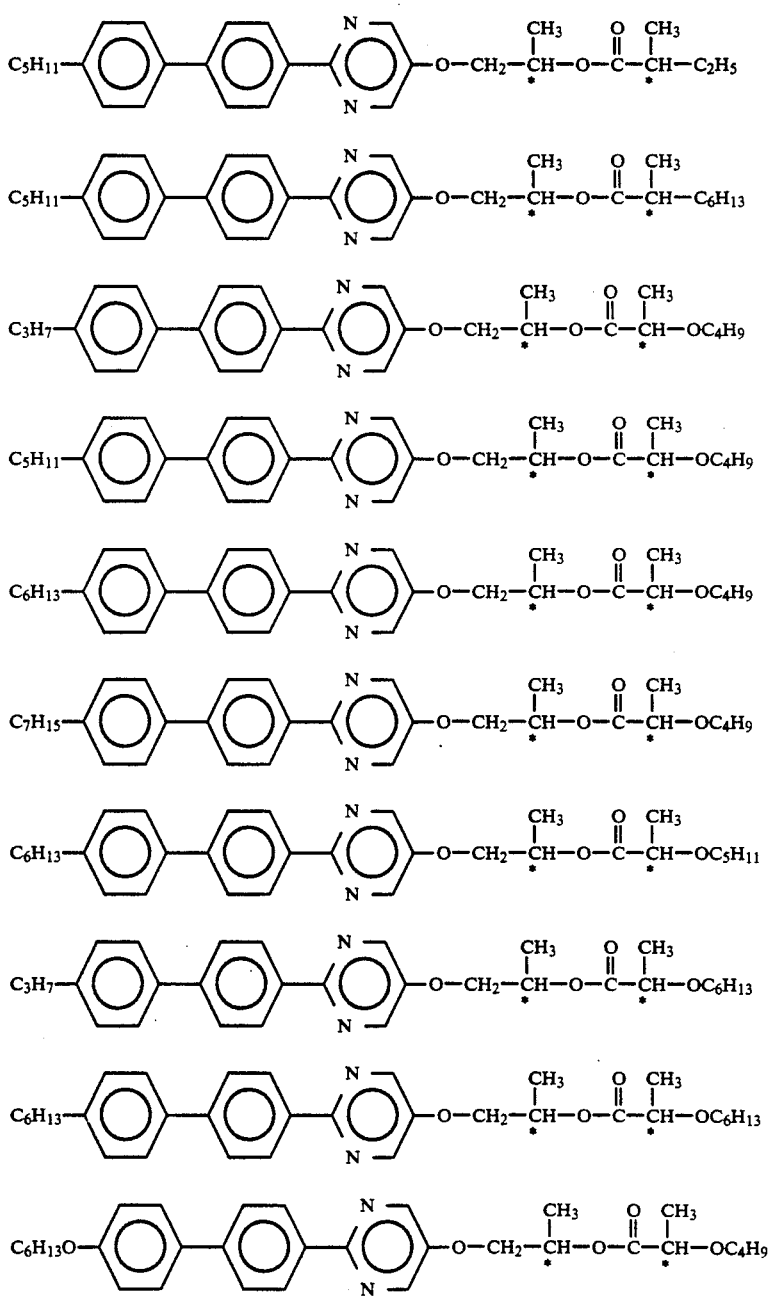

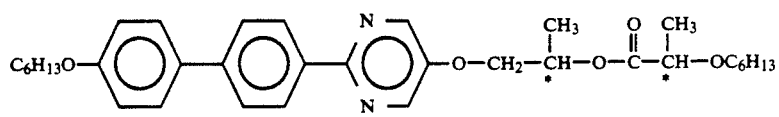
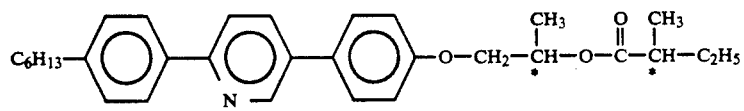
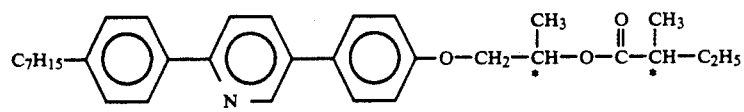
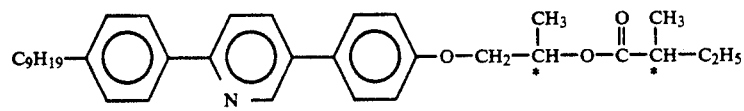
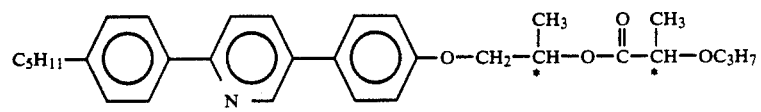
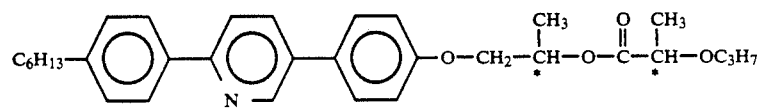
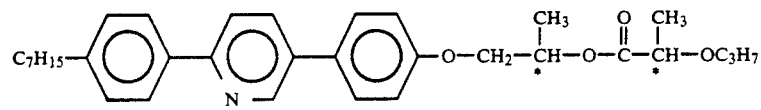
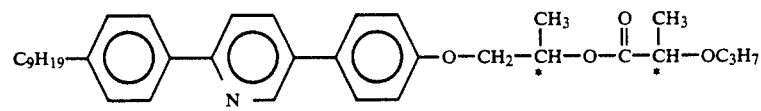
(7) A ferroelectric liquid crystal composition according to the above-described item (1), wherein said component C is at least one compound selected from the group consisting of the following compounds:
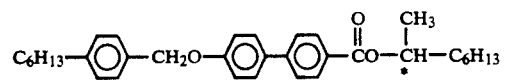
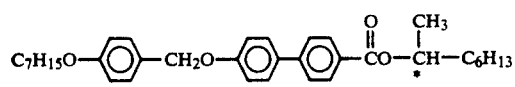
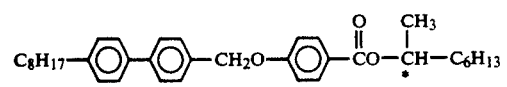
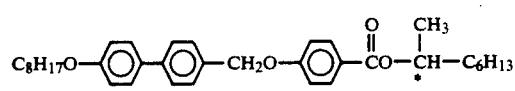
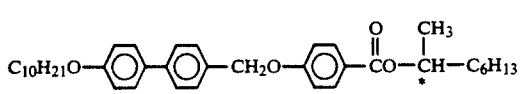
-continued
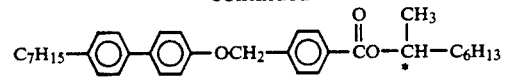
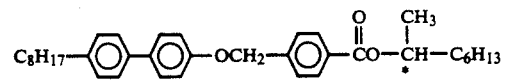
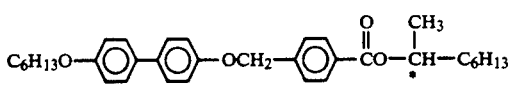
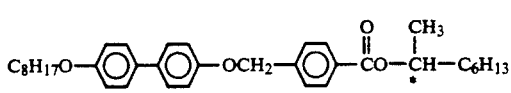
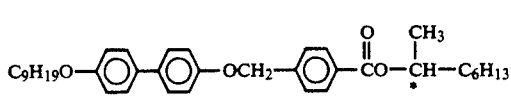

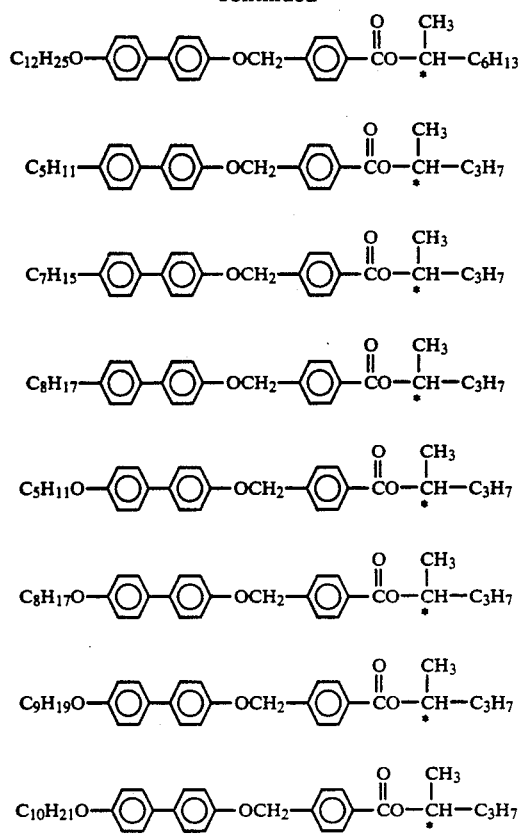

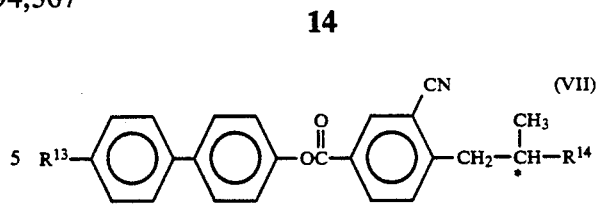

wherein $R^{13}$ is a straight-chain or branched alkyl or alkoxy group having 1 to 18 carbon atoms, $R^{14}$ is a straight-chain or branched alkyl group having 2 to 18 carbon atoms and * represents an asymmetric carbon atom.

(9) A ferroelectric liquid crystal composition according to the above-described item 8, wherein said component D is at least one compound selected from the group consisting of compounds represented by the general formula (VI) wherein $R^{11}$ is a straight-chain alkyl or alkoxy group having 5 to 12 carbon atoms, $R^{12}$ is a straight-chain alkyl group having 2 to 10 carbon atoms and Y is —CN or —F; and compounds represented by the general formula (VII) wherein $R^{13}$ is a straight-chain alkyl or alkoxy group having 5 to 12 carbon atoms and $R^{14}$ is a straight-chain alkyl group having 2 to 10 carbon atoms.

(10) A ferroelectric liquid crystal composition according to the above-described item 8, wherein said component D is at least one compound selected from the group consisting of the following compounds:

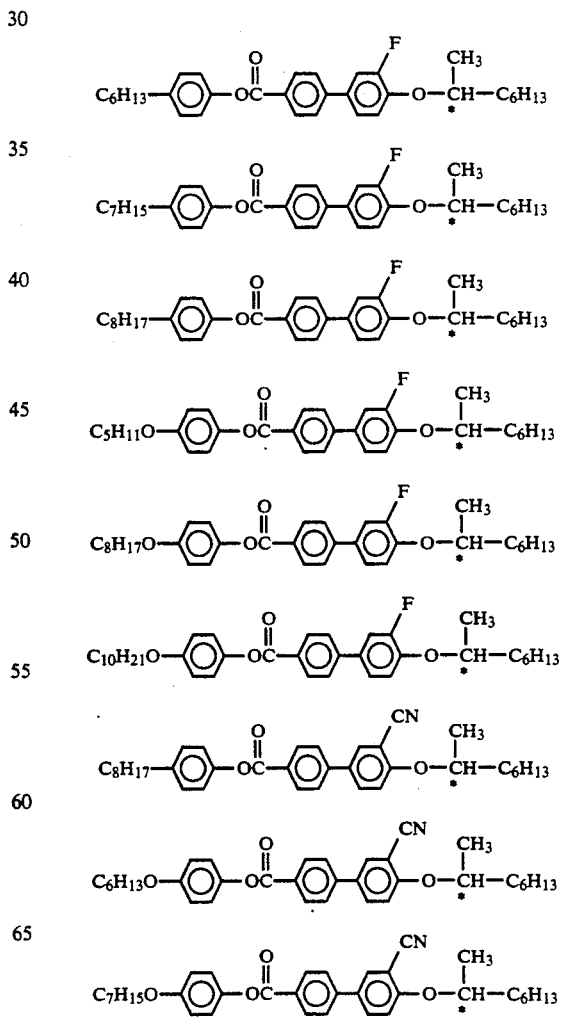

According to the second aspect of the present invention, there is provided the following ferroelectric liquid crystal compositions.

(8) A ferroelectric liquid crystal composition comprising four components, i.e., the above-described three components A, B and C and further component D in an amount of 2 to 5% by weight based on the total amount of the components A, B and C, and having a phase sequence series of an isotropic liquid, a cholesteric phase, a smectic A phase and a chiral smectic C proceeding phase in that order from the high temperature side and a spontaneous polarization value of 30 $nC/cm^2$ or less, said component D being at least one compound selected from the group consisting of compounds represented by the general formula (VI):

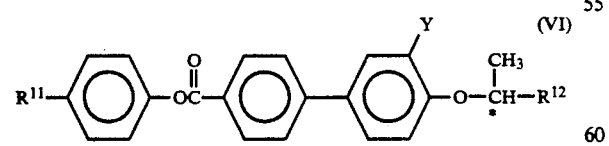

wherein $R^{11}$ is a straight-chain or branched alkyl or alkoxy group having 1 to 18 carbon atoms, $R^{12}$ is a straight-chain or branched alkyl group having 2 to 18 carbon atoms, Y is a cyano group or a halogen atom and * represents an asymmetric carbon atom, and compounds represented by the general formula (VII):

-continued

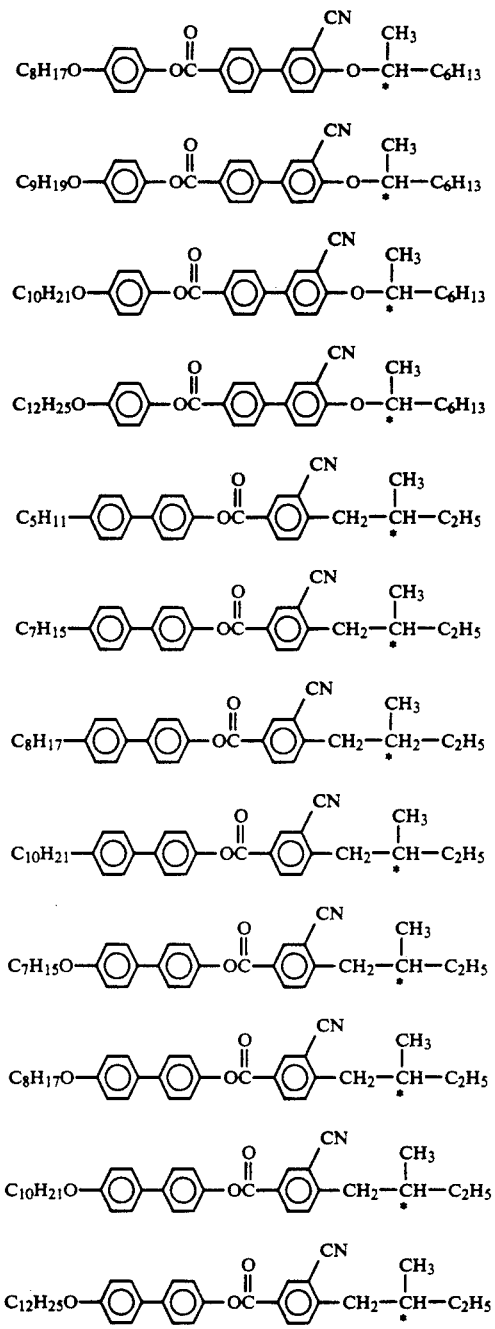

(11) According to the third aspect of the present invention, there is provided an optical switching element comprising a ferroelectric liquid crystal composition according to the above-described item (1) or (8).

The non-chiral compound represented by the general formula (I) or (II) as the component A described in the above-described item (1) is a known compound which has an excellent smectic C property and serves as a base $S_C$ compound (i.e., exhibits an $S_C$ phase over a wide temperature range) in the ferroelectric liquid crystal composition attempted in the present invention. The compound represented by the general formula (I) exhibits an $S_C$ phase in a relatively low temperature region around room temperature, while the compound represented by the general formula (II) exhibits an $S_C$ phase in a relatively high temperature region. For example, when in the general formula (I) $R^1$ is $C_6H_{13}O-$ and $R^2$ is $-C_8H_{17}$, the phase transition temperature is $Cr28S_C47S_A58N66I_{SO}$. On the other hand, when in the general general formula (II) $R^3$ is $C_7H_{15}-$ and $R^4$ is $-C_8H_{17}$, the phase transition temperature is $Cr58S_C134S_A144N157I_{SO}$. Therefore, a base $S_C$ mixture having an $S_C$ phase over a wide temperature range from a low temperature region to a high temperature region can be prepared through a combination of compounds represented by the general formula (I) or (II). In view of the above, a compound having an $S_C$ phase is preferably used. However, it is also possible to use a compound not having an $S_C$ phase in such an amount as will bring about no remarkable reduction in the temperature range of the $S_C*$ phase. The compound represented by the general formula (I) or (II) has an $S_A$ phase and a nematic phase (hereinafter simply referred to "N phase") on the high temperature side of the $S_C$ phase and plays an important role in the appearance of the phase series $I_{SO}-N*-S_A-S_C*$.

Examples of the compound represented by the general formula (I) include phenyl pyrimidine compounds wherein $R^1$ is a straight-chain alkoxy or alkanoyloxy group having 5 to 12 carbon atoms and $R^2$ is a straight-chain alkyl group having 7 to 11 carbon atoms, and examples of the compound represented by the general formula (II) include biphenyl pyrimidine compounds wherein $R^3$ is a straight-chain alkyl or alkoxy group having 5 to 10 carbon atoms and $R^4$ is a straight-chain alkyl group having 6 to 10 carbon atoms. In the present invention, it is preferred to use a plurality of the above-described pyrimidine compounds.

Particularly preferred examples of the pyrimidine compound having an $S_C$ phase are shown in the following Tables 1 and 2.

TABLE 1

Compounds represented by the formula $R^1-\bigcirc-\bigcirc_{N}^{N}-R^2$

| $R^1$ | $R^2$ | $R^1$ | $R^2$ |
|---|---|---|---|
| $C_6H_{13}O-$ | $C_8H_{17}-$ | $C_7H_{15}O-$ | $C_9H_{19}-$ |
| " | $C_9H_{19}-$ | " | $C_{10}H_{21}-$ |
| " | $C_{10}H_{21}-$ | " | $C_{11}H_{23}-$ |
| " | $C_{11}H_{23}-$ | $C_8H_{17}O-$ | $C_8H_{17}-$ |
| $C_8H_{17}O-$ | $C_9H_{19}-$ | $C_{12}H_{25}O-$ | $C_7H_{15}-$ |
| " | $C_{10}H_{21}-$ | " | $C_8H_{17}-$ |
| " | $C_{11}H_{23}-$ | $C_5H_{11}COO-$ | $C_8H_{17}-$ |
| $C_9H_{19}O-$ | $C_7H_{15}-$ | $C_6H_{13}COO-$ | " |
| " | $C_8H_{17}-$ | $C_7H_{15}COO-$ | " |
| " | $C_9H_{19}-$ | $C_8H_{17}COO-$ | " |
| " | $C_{10}H_{21}-$ | $C_9H_{19}COO-$ | " |
| $C_{10}H_{21}O-$ | $C_8H_{17}-$ | $C_{10}H_{21}COO-$ | " |
| $C_{11}H_{23}O-$ | $C_7H_{15}-$ | $C_{11}H_{23}COO-$ | " |
| " | $C_8H_{17}-$ | | |

TABLE 2

Compounds represented by the formula $R^3-\bigcirc-\bigcirc-\bigcirc_{N}^{N}-R^4$

| $R^3$ | $R^4$ | $R^3$ | $R^4$ |
|---|---|---|---|
| $C_5H_{11}-$ | $C_6H_{13}-$ | $C_5H_{11}O-$ | $C_6H_{13}-$ |

TABLE 2-continued

Compounds represented by the formula

R³—⟨phenyl⟩—⟨phenyl⟩—⟨pyrimidine with N,N⟩—R⁴

| R³ | R⁴ | R³ | R⁴ |
|---|---|---|---|
| " | C₇H₁₅— | " | C₇H₁₅— |
| " | C₈H₁₇— | " | C₈H₁₇— |
| C₆H₁₃— | C₆H₁₃— | C₆H₁₃O— | C₆H₁₃— |
| " | C₇H₁₅— | " | C₇H₁₅— |
| " | C₈H₁₇— | " | C₈H₁₇— |
| C₇H₁₅— | C₆H₁₃— | C₇H₁₅O— | C₆H₁₃— |
| " | C₇H₁₅— | " | C₇H₁₅— |
| " | C₈H₁₇— | " | C₈H₁₇— |
| C₈H₁₇— | C₆H₁₃— | C₈H₁₇O— | C₆H₁₃— |
| " | C₇H₁₅— | " | C₇H₁₅— |
| " | C₈H₁₇— | " | C₈H₁₇— |

In the ferroelectric liquid crystal compositions according to the present invention, the component A serves as a base $S_C$ compound and has the function of allowing an $I_{SO}$—$N^*$—$S_A$—$S_C^*$ phase series to appear. Therefore, it is preferred that the concentration of the component A be 75% by weight or more. When the concentration is less than 75% by weight, the amount of the optically active compound becomes relatively large and the spontaneous polarization value of the liquid crystal composition becomes 30 nC/cm² or more, which brings about an abnormal phenomenon when a switching operation is conducted.

The optically active compounds represented by the general formula (III) or (IV) as the component B described in the above-described item (1) are those disclosed in Japanese Patent Application Laid-Open No. 267763/1988 and Japanese Patent Application Laid-Open No. 63571/1989, and have a large spontaneous polarization value and excellent response characteristics. For example, when in the general formula (III) R⁵ is C₆H₁₃O— and R⁶ is —OC₆H₁₃, the compound has a phase transition temperature of Cr67$S_C^*$96$N^*$107$I_{SO}$, a spontaneous polarization value of 327 nC/cm² (T−T$_C$=−10° C.), a tilt angle of 45° (T−T$_C$=−10° C.) and a response time of 45 μsec (T−T$_C$=−10° C., E=5 V/μm). When in the general formula (IV) R⁷ is C₉H₁₉— and R⁸ is —OC₃H₇, the compound has a phase transition temperature of Cr70$S_C^*$103$S_A$108$N^*$110$I_{SO}$, a spontaneous polarization value of 243 nC/cm² (T−T$_C$=−10° C.), a tilt angle of 38° (T− T$_C$=−10° C.) and a response time of 30 μsec (T−T$_C$=−10° C., E=5 V/μm). Thus, in the ferroelectric liquid crystal composition of the present invention, the above-described compounds play an important role in the attainment of a quick response.

Examples of the compound represented by the general formula (III) include compounds wherein R⁵ is a straight-chain alkyl or alkoxy group having 3 to 10 carbon atoms and R⁶ is a straight-chain alkyl or alkoxy group having 2 to 10 carbon atoms, and examples of the compound represented by the general formula (IV) include optically active compounds wherein R⁷ is a straight-chain alkyl or alkoxy group having 3 to 10 carbon atoms and R⁸ is a straight-chain alkyl or alkoxy group having 2 to 10 carbon atoms. Examples of the compound represented by the general formula (III) or (IV) are shown in the following Tables 3 and 4.

TABLE 3

Compounds represented by the formula

R⁵—⟨phenyl⟩—⟨phenyl⟩—⟨pyrimidine N,N⟩—O—CH₂—$\overset{*}{\text{CH}}$(CH₃)—O—C(=O)—$\overset{*}{\text{CH}}$(CH₃)—R⁶

| R⁵ | R⁶ | R⁵ | R⁶ |
|---|---|---|---|
| C₅H₁₁— | —C₂H₅ | C₆H₁₃— | —OC₅H₁₁ |
| C₅H₁₁— | —C₆H₁₃ | C₃H₇— | —OC₆H₁₃ |
| C₃H₇— | —OC₄H₉ | C₆H₁₃— | —OC₆H₁₃ |
| C₅H₁₁— | —OC₄H₉ | C₆H₁₃O— | —OC₄H₉ |
| C₆H₁₃— | —OC₄H₉ | C₆H₁₃O— | —OC₆H₁₃ |
| C₇H₁₅— | —OC₄H₉ | | |

TABLE 4

Compounds represented by the formula

R⁷—⟨phenyl⟩—⟨pyridine N⟩—⟨phenyl⟩—O—CH₂—$\overset{*}{\text{CH}}$(CH₃)—O—C(=O)—$\overset{*}{\text{CH}}$(CH₃)—R⁸

| R⁷ | R⁸ | R⁷ | R⁸ |
|---|---|---|---|
| C₆H₁₃— | —C₂H₅ | C₆H₁₃— | —OC₃H₇ |
| C₇H₁₅— | —C₂H₅ | C₇H₁₅— | —OC₃H₇ |
| C₉H₁₉— | —C₂H₅ | C₉H₁₉— | —OC₃H₇ |
| C₅H₁₁— | —OC₃H₇ | | |

In the compounds represented by the general formulae (III) and (IV), when the absolute configuration of the optically active site is (S, S) or (S, R), the polarity of the spontaneous polarization was (−) and the helical twist sense was left-handed. On the other hand, when the absolute configuration is (R, R) or (R, S), the polarity of the spontaneous polarization was (+) and the helical twist sense was right-handed.

In the ferroelectric liquid crystal composition attempted in the present invention, the component B plays an important role in the attainment of a quick response. However, when the amount is excessively large, the spontaneous polarization value of the liquid crystal composition becomes 30 nC/cm² or more, which brings about an abnormal phenomenon when a switching operation is conducted. For this reason, the concentration of the component B is preferably 9 % by weight or less.

The optically active compound represented by the general formula (V) as the component C described in the above item 1 is a compound disclosed in Japanese Patent Application Laid-Open No. 149547/1985. This compound and the optically active compound represented by the general formula (III) or (IV) are the same in polarity in spontaneous polarization and opposite in helical twist sense. Therefore, in the ferroelectric liquid crystal composition according to the present invention, it serves as a helical pitch modifier and lengthens the helical pitch of the liquid crystal composition. Further, it has a large spontaneous polarization value and is excellent in response characteristics although the response time is slower than that of component B. For example, when in the general formula (V), $R^9$ is $C_7H_{15}O-$, $R^{10}$ is $-C_6H_{13}$, m is 1, n is 2 and x is $-CH_2O-$, the compound has a phase transition temperature of $Cr110(S_C*105S_A108)I_{SO}$, a spontaneous polarization value of 142 $nC/cm^2$ ($T-T_C=-10°$ C.), a tilt angle of 27° ($T-T_C=-10°$ C.) and a response time of 60 μsec ($T-T_C=-10°$ C., E=5 V/μm). Therefore, a ferroelectric liquid crystal composition having a large helical pitch length and a quick response can be prepared through a combination of a compound corresponding to component C with compounds represented by the general formula (III) and (IV) as component (B).

Examples of the compound represented by the general formula (V) include optically active compounds wherein $R^9$ is a straight-chain alkyl group or alkoxy group having 6 to 12 carbon atoms and $R^{10}$ is a straight-chain alkyl group having 2 to 10 carbon atoms. Representative examples of the compound represented by the general formula (V) are shown in the following Tables 5 to 7.

TABLE 5

Compounds represented by the formula $R^9-\bigcirc-CH_2O-\bigcirc-\bigcirc-CO-CH(CH_3)-R^{10}$

| $R^9$ | $R^{10}$ | $R^9$ | $R^{10}$ |
| --- | --- | --- | --- |
| $C_6H_{13}-$ | $-C_6H_{13}$ | $C_7H_{15}O-$ | $-C_6H_{13}$ |

TABLE 6

Compounds represented by the formula $R^9-\bigcirc-\bigcirc-CH_2O-\bigcirc-CO-CH(CH_3)-R^{10}$

| $R^9$ | $R^{10}$ | $R^9$ | $R^{10}$ |
| --- | --- | --- | --- |
| $C_8H_{17}-$ | $-C_6H_{13}$ | $C_{10}H_{21}O-$ | $-C_6H_{13}$ |
| $C_8H_{17}O-$ | $-C_6H_{13}$ | | |

TABLE 7

Compounds represented by the formula $R^9-\bigcirc-\bigcirc-OCH_2-\bigcirc-CO-CH(CH_3)-R^{10}$

| $R^9$ | $R^{10}$ | $R^9$ | $R^{10}$ |
| --- | --- | --- | --- |
| $C_7H_{15}-$ | $-C_6H_{13}$ | $C_5H_{11}-$ | $-C_3H_7$ |
| $C_8H_{17}-$ | $-C_6H_{13}$ | $C_7H_{15}-$ | $-C_3H_7$ |

TABLE 7-continued

Compounds represented by the formula $R^9-\bigcirc-\bigcirc-OCH_2-\bigcirc-CO-CH(CH_3)-R^{10}$

| $R^9$ | $R^{10}$ | $R^9$ | $R^{10}$ |
| --- | --- | --- | --- |
| $C_6H_{13}O-$ | $-C_6H_{13}$ | $C_8H_{17}-$ | $-C_3H_7$ |
| $C_8H_{17}O-$ | $-C_6H_{13}$ | $C_5H_{11}O-$ | $-C_3H_7$ |
| $C_9H_{19}O-$ | $-C_6H_{13}$ | $C_8H_{17}O-$ | $-C_3H_7$ |
| $C_{10}H_{21}O-$ | $-C_6H_{13}$ | $C_9H_{19}O-$ | $-C_3H_7$ |
| $C_{12}H_{25}O-$ | $-C_6H_{13}$ | $C_{10}H_{21}O-$ | $-C_3H_7$ |

In the compounds represented by the general formula (V), when the absolute configuration of the optically active site is R, the polarity of the spontaneous polarization was (−) and the helical twist sense was right-handed. On the other hand, when the absolute configuration is S, the polarity of the spontaneous polarization was (+) and the helical twist sense was left-handed. Therefore, when the absolute configuration of the compound as the component B represented by the general formula (III) or (IV) is (S, S) or (S, R), it is possible to prepare a ferroelectric liquid crystal composition having a large helical pitch through a combination of this compound with the compound represented by the general formula (V) as component C of which the absolute configuration is R.

In the ferroelectric liquid crystal composition attempted in the present invention, the component C serves mainly as a helical pitch modifier for the component B and lengthens the helical pitch without detriment to the response characteristics of the liquid crystal composition. However, when the amount is excessively large, it has an adverse effect on the response characteristics or has an adverse effect on the phase series Iso→N*→$S_A$→$S_C$* due to its poor N* property. Therefore, the concentration of the component C is preferably 12% by weight or less.

The ferroelectric liquid crystal composition according to the present invention can be prepared mainly through a combination of the above-described three components, i.e., components A, B and C. Use of the component D as an additional component enables a ferroelectric liquid crystal composition having better characteristics to be prepared.

The optically active compound represented by the general formula (VI) or (VII) as the component D described in the above item 8 is a compound disclosed in Japanese Patent Application Laid-Open No. 210056/1986, 48254/1988 or 233966/1988 and is not very quick in the response time. However, this compound has a small helical pitch length, and this compound and the optically active compound corresponding to component B, represented by the general formula (III) or (IV), are the same in polarity in spontaneous polarization and opposite in helical twist sense. Thus the ferroelectric liquid crystal composition of the present invention, it serves as a helical pitch modifier, and use thereof as a helical pitch modifier in combination with the above-described optically active compound as the component C represented by the general formula (V) enables the helical pitch of the liquid crystal composition to be further lengthened.

Examples of the compound represented by the general formula (VI) or (VII) include compounds represented by the formula (VI) wherein $R^{11}$ is a straight-chain alkyl or alkoxy group having 5 to 12 carbon atoms, $R^{12}$ is a straight-chain alkyl group having 2 to 10 carbon atoms and Y is —CN or —F, or optically active compounds represented by the formula (VII) wherein $R^{13}$ is a straight-chain alkyl or alkoxy group having 5 to 12 carbon atoms and $R^{14}$ is a straight-chain alkyl group having 2 to 10 carbon atoms. Representative examples of the compound represented by the general formula (VI) or (VII) are shown in the following Tables 8 to 10.

TABLE 8

Compounds represented by the formula

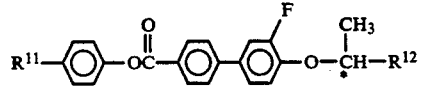

| $R^{11}$ | $R^{12}$ | $R^{11}$ | $R^{12}$ |
| --- | --- | --- | --- |
| $C_6H_{13}$— | —$C_6H_{13}$ | $C_5H_{11}O$— | —$C_6H_{13}$ |
| $C_7H_{15}$— | —$C_6H_{13}$ | $C_8H_{17}O$— | —$C_6H_{13}$ |
| $C_8H_{17}$— | —$C_6H_{13}$ | $C_{10}H_{21}O$— | —$C_6H_{13}$ |

TABLE 9

Compounds represented by the formula

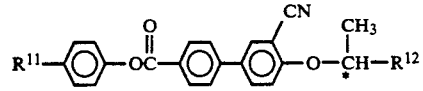

| $R^{11}$ | $R^{12}$ | $R^{11}$ | $R^{12}$ |
| --- | --- | --- | --- |
| $C_8H_{17}$— | —$C_6H_{13}$ | $C_9H_{19}O$— | —$C_6H_{13}$ |
| $C_6H_{13}O$— | —$C_6H_{13}$ | $C_{10}H_{21}O$— | —$C_6H_{13}$ |
| $C_7H_{15}O$— | —$C_6H_{13}$ | $C_{12}H_{25}O$— | —$C_6H_{13}$ |
| $C_8H_{17}O$— | —$C_6H_{13}$ | | |

TABLE 10

Compounds represented by the formula

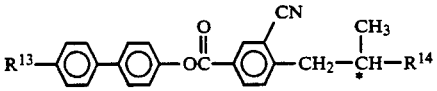

| $R^{13}$ | $R^{14}$ | $R^{13}$ | $R^{14}$ |
| --- | --- | --- | --- |
| $C_5H_{11}$— | —$C_2H_5$ | $C_7H_{15}O$— | —$C_2H_5$ |
| $C_7H_{15}$— | —$C_2H_5$ | $C_8H_{17}O$— | —$C_2H_5$ |
| $C_8H_{17}$— | —$C_2H_5$ | $C_{10}H_{21}O$— | —$C_2H_5$ |
| $C_{10}H_{21}$— | —$C_2H_5$ | $C_{12}H_{25}O$— | —$C_2H_5$ |

In the compounds represented by the general formulae (VI) and (VII), when the absolute configuration of the optically active site is S, the polarity of the spontaneous polarization was (—) and the helical twist sense was right-handed. On the other hand, when the absolute configuration is R, the polarity of the spontaneous polarization was (+) and the helical twist sense was left-handed.

In the ferroelectric composition of the present invention, the component D serves as a helical pitch modifier and plays an important role in lengthening the helical pitch of the liquid crystal composition. However, this compound is poor in response characteristics, and use thereof in an excessive amount deteriorates the response characteristics of the liquid crystal composition. In view of the above, the concentration of the component D is preferably 5% by weight or less.

The present inventors have made various studies on proportions of components necessary for obtaining a ferroelectric liquid crystal composition attempted in the present invention by taking advantage of the above-described characteristics of components A, B, C and D and, as a result have found that the proportions of the components A, B and C are 75 to 95% by weight, 3 to 9% by weight and 3 to 12% by weight, respectively, and the proportion of the component D is preferably 2 to 5% by weight, based on the total amount of the three components, i.e., components A, B, and C, which has led to the completion of the present invention.

When the amount of a component is less than the lower limit described above, the desired effect of that component cannot be attained.

The present invention provides a ferroelectric liquid crystal composition having excellent orientation, with no defect and also having a quick response. The invention also provides a liquid crystal element free from occurrence of abnormal phenomenon in a switching operation and having excellent memory property, very excellent contrast and quick response through the use of the above-described liquid crystal composition.

Examples of particular applications for the ferroelectric liquid crystal composition of the present invention include high-speed liquid crystal shutters and high definition liquid crystal displays.

EXAMPLES

The present invention will now be described in more detail by way of the following examples. However, the present invention is not limited to these examples only.

In the examples, various measurements were conducted by the following methods.

The spontaneous polarization value (Ps) was measured by the Sawyer-Tower method. The tilt angle ($\theta$) was determined by applying a sufficiently high electric field exceeding a critical electric field to a homogeneously aligned cell to bring about disappearance of a helical structure, reversing the polarity and measuring the travel angle (corresponding to 2$\theta$) of the extinction position under crossed-nicol prisms.

The response time was measured by injecting each composition into a cell subjected to an aligning treatment and having an electrode-to-electrode distance of 2 $\mu$m, applying a rectangular wave of 1 kHz having a peak-to-peak voltage $V_{pp}$ of 20 V and measuring a change in the transmitted light intensity.

The Sc* pitch was determined by using a cell of about 200 $\mu$m thickness subjected to homogeneous orientation and directly measuring line intervals of a striped pattern (dechiralization lines) corresponding to a helical pitch under a polarization microscope.

The N* pitch was indirectly determined by using a wedge-shaped cell, measuring intervals (l) of line defections (discrimination lines) and calculating the pitch according to the theoretical equation P (pitch)=2 l tan $\theta$ wherein $\theta$ is the tilt angle of the wedge-shaped cell.

EXAMPLE 1

A ferroelectric liquid crystal composition having the following composition was prepared by using compounds represented by the general formulae (I), (II), (III) and (V).

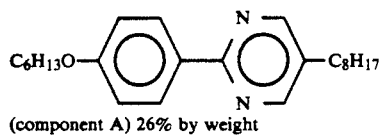

(component A) 26% by weight

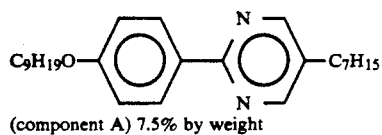

(component A) 7.5% by weight

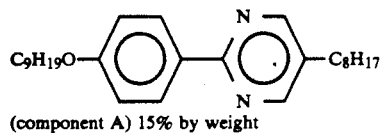

(component A) 15% by weight

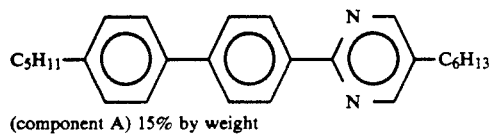

(component A) 15% by weight

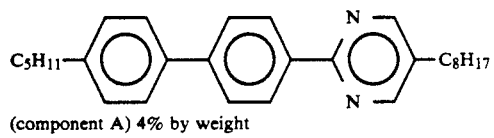

(component A) 4% by weight

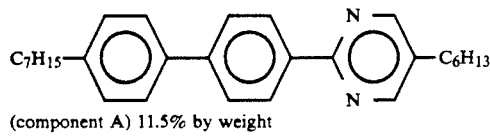

(component A) 11.5% by weight (S, S)

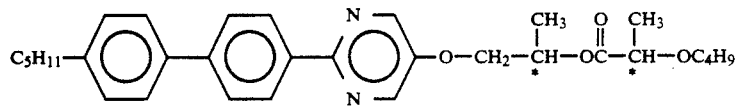

(component B) 9% by weight (R)

(component C) 12% by weight

The ferroelectric liquid crystal composition exhibits the following phase transition temperature.

The spontaneous polarization value, tilt angle and response time each at 25° C. were 24 nC/cm², 20° and 63 μsec, respectively. The pitch of the N* phase was 12 μm at 85° C., and the pitch of the Sc* phase was 8 μm at 25° C.

The above liquid crystal composition was injected into a cell equipped with a transparent electrode and having a cell gap of 2 μm. The cell was one wherein a polyimide as an aligning treatment was applied to the cell and the surface of the cell was rubbed for homogeneous aligning. The liquid crystal composition was then gradually cooled from the N* phase to Sc* phase (cooling rate: 1° C./min), and a pair of polarizers were provided in a crossed nicol state for observation under a microscope. As a result, it was confirmed that a homogeneous orientation could be attained without any defect. The contrast ratio was 1:20.

As is apparent from the foregoing description, a ferroelectric liquid crystal composition exhibiting an Sc* phase over a wide temperature range including room temperature, having an $I_{SO}$—N*—$S_A$—$S_C$* phase series, a long helical pitch, a spontaneous polarization value of 30 nC/cm² or less and also quick response can be prepared through a combination of compounds of the three components, i.e., components A, B and C, respectively represented by the general formulae (I), (II), (III) and (V). It is also apparent that a liquid crystal element capable of easily attaining good orientation and exhibiting an excellent contrast can be prepared through the use of the above-described liquid crystal composition.

EXAMPLE 2

A ferroelectric liquid crystal composition having the following composition was prepared by using compounds represented by the general formulae (I), (II), (III), (V) and (VI).

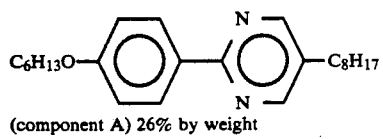

(component A) 26% by weight

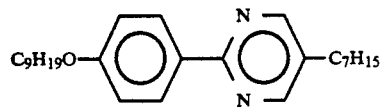

(component A) 7.5% by weight

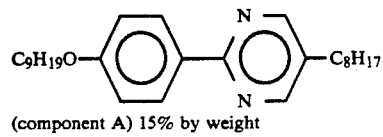

(component A) 15% by weight

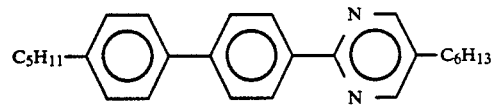

(component A) 15% by weight

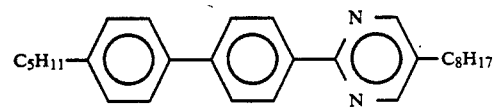

(component A) 4% by weight

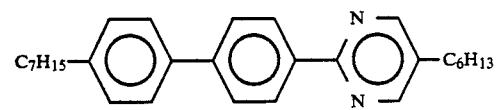

(component A) 11.5% by weight (S, S)

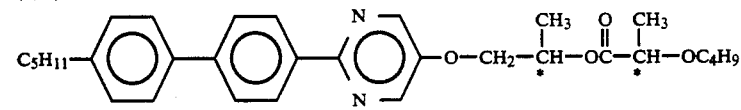

(component B) 9% by weight (R)

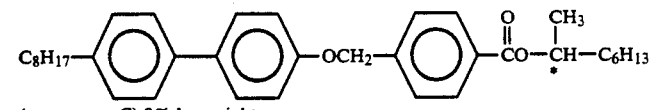

(component C) 9% by weight (S)

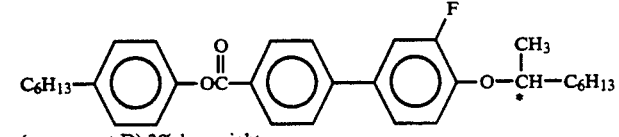

(component D) 2% by weight

The above-described ferroelectric liquid crystal composition exhibits the following phase transition temperature.

The spontaneous polarization value, tilt angle and response time each at 25° C. were 26 nC/cm$^2$, 22° and 64 μsec, respectively. The pitch of the N* phase was 42 μm at 81° C., and the pitch of the Sc* phase was 11 μm at 25° C.

The above liquid crystal composition was injected into the same cell having a cell gap of 2 μm as that used in Example 1, quenched from the N phase to Sc* phase (cooling rate: 10° C./min), and observed under a microscope. As a result, it was confirmed that a homogeneous orientation could be attained without any defect. The contrast ratio was 1:25.

As is apparent from the foregoing description, a ferroelectric liquid crystal composition having an —Iso—N*—$S_A$—$S_{C}$* phase series and a longer helical pitch and a quick response can be prepared through a combination of compounds of the three components, i.e., components A, B and C, respectively represented by the general formulae (I), (II), (III) and (V) with a compound represented by the general formula (VI) as component D. It is also apparent that a practicable liquid crystal element capable of attaining good orientation even when quenched and exhibiting an excellent contrast can be prepared through the use of the above-described liquid crystal composition.

EXAMPLES 3 TO 9

Ferroelectric liquid crystal compositions having compositions shown in Table 11 were prepared and evaluated in the same manner as that of Example 1 or 2. The characteristics of the liquid crystal compositions of Examples 3 to 9 are shown in Table 12.

COMPARATIVE EXAMPLES 1 AND 2

The characteristics of a composition falling outside the composition of the present invention with respect to the mixing proportions of the components A, B, and C and a composition falling outside the composition of the present invention with respect to the mixing proportions of the components A, B, C and D are shown in Table 12 respectively as Comparative Examples 1 and 2.

TABLE 11

| Component | Formula | Compound | Ex. No. 3 | 4 | 5 | 6 | 7 | 8 | 9 | Comp. Ex. 1 | 2 |
|---|---|---|---|---|---|---|---|---|---|---|---|
| A | I | C6H13O—⌬—⌬(N,N)—C8H17 | 33 | 30 | 28 | 24 | 28 | 26 | 26 | 24 | 34 |
|  | I | C9H19O—⌬—⌬(N,N)—C7H15 | 10 | 8 | 8 | 7 | 8 | 7 | 7 | 7 | 11 |
|  | I | C9H19O—⌬—⌬(N,N)—C8H17 | 18 | 17 | 16 | 14 | 16 | 15 | 15 | 13 | 18 |
|  | II | C5H11—⌬—⌬—⌬(N,N)—C6H13 | 20 | 17 | 16 | 15 | 16 | 15 | 15 | 15 | 20 |
|  | II | C5H11—⌬—⌬—⌬(N,N)—C8H17 | — | — | 6 | — | 6 | 5 | 4 | — | — |
|  | II | C7H15—⌬—⌬—⌬(N,N)—C6H13 | 14 | 13 | 12 | 11 | 12 | 12 | 12 | 10 | 14 |
|  | II | C7H15—⌬—⌬—⌬(N,N)—C8H17 | — | — | — | 4 | — | — | — | — | — |
| B | III | (S,S)C3H7—⌬—⌬—⌬(N,N)—O—CH2—CH(CH3)—OC(=O)—CH(CH3)—OC4H9 | — | — | — | — | — | 4 | — | 2 | — |

TABLE 11-continued

| Component | Formula | Compound | | Ex. No. | | | | | | | | | Comp. Ex. | |
|---|---|---|---|---|---|---|---|---|---|---|---|---|---|---|
| | | | | 3 | 4 | 5 | 6 | 7 | 8 | 9 | | | 1 | 2 |
| | III | (S,S)C$_5$H$_{11}$–⟨N⟩–⟨⟩–⟨⟩–O–CH$_2$–CH(CH$_3$)–OC(=O)–CH(CH$_3$)–OC$_4$H$_9$ | | 3 | — | — | — | — | — | — | | | — | 10 |
| | III | (S,S)C$_5$H$_{11}$–⟨N⟩–⟨⟩–⟨⟩–O–CH$_2$–CH(CH$_3$)–OC(=O)–CH(CH$_3$)–OC$_6$H$_{13}$ | | — | — | — | — | 3 | — | — | | | — | — |
| | III | (S,S)C$_7$H$_{15}$–⟨N⟩–⟨⟩–⟨⟩–O–CH$_2$–CH(CH$_3$)–OC(=O)–CH(CH$_3$)–OC$_4$H$_9$ | | — | — | — | — | — | 4 | — | | | — | — |
| | IV | (S,S)C$_6$H$_{13}$–⟨⟩–⟨N⟩–⟨⟩–O–CH$_2$–CH(CH$_3$)–OC(=O)–CH(CH$_3$)–OC$_3$H$_7$ | | — | — | — | 4 | — | — | — | | | — | — |
| | IV | (S,S)C$_6$H$_{13}$–⟨⟩–⟨N⟩–⟨⟩–O–CH$_2$–CH(CH$_3$)–OC(=O)–CH(CH$_3$)–OC$_2$H$_5$ | | 5 | — | 3 | — | — | — | — | | | — | — |
| | IV | (S,S)C$_7$H$_{15}$–⟨⟩–⟨N⟩–⟨⟩–O–CH$_2$–CH(CH$_3$)–OC(=O)–CH(CH$_3$)–OC$_4$H$_9$ | | — | — | — | 5 | — | — | — | | | — | — |
| | IV | (S,S)C$_9$H$_{19}$–⟨⟩–⟨N⟩–⟨⟩–O–CH$_2$–CH(CH$_3$)–OC(=O)–CH(CH$_3$)–OC$_3$H$_7$ | | — | 7.5 | — | — | — | — | — | | | — | — |
| C | V | (R)C$_7$H$_{15}$–CH(CH$_3$)–O–⟨⟩–⟨⟩–OCH$_2$–⟨⟩–OC(=O)–CH(CH$_3$)–C$_6$H$_{13}$ | | — | — | 8 | — | — | — | — | | | 2 | — |

TABLE 11-continued

| Component | Formula | Compound | Ex. No. 3 | 4 | 5 | 6 | 7 | 8 | 9 | Comp. Ex. 1 | 2 |
|---|---|---|---|---|---|---|---|---|---|---|---|
| | V | (R)C7H15—⌬—⌬—OCH2—⌬—CO—CH(CH3)—C2H5 (O=) * | — | — | — | — | — | 4 | — | — | — |
| | V | (R)C8H17—⌬—⌬—OCH2—⌬—CO—CH(CH3)—C6H13 (O=) * | 3 | — | — | 6 | 4 | 4 | 9 | — | 13 |
| | V | (R)C10H21O—⌬—⌬—OCH2—⌬—CO—CH(CH3)—C6H13 (O=) * | — | 7.5 | — | — | — | — | — | — | — |
| | V | (R)C6H13—⌬—CH2O—⌬—⌬—CO—CH(CH3)—C6H13 (O=) * | — | — | — | 6 | — | — | — | — | — |
| D | VI | (S)C8H17—⌬—⌬(OC(=O))—⌬(CN)—O—CH(CH3)—C6H13 * | — | — | — | — | — | 5 | — | — | — |
| | VII | (S)C8H17O—⌬—⌬(OC(=O))—⌬(CN)—CH2CH(CH3)—C2H5 * | — | — | — | — | — | — | 3 | — | 6 |

TABLE 12

| Characteristics | Ex. No. | | | | | | | Comp. Ex. | |
|---|---|---|---|---|---|---|---|---|---|
| | 3 | 4 | 5 | 6 | 7 | 8 | 9 | 1 | 2 |
| Phase transition temp. (°C.) | | | | | | | | | |
| Cr → Sc* | −5 | −4 | −7 | −5 | −3 | −8 | −6 | −2 | −4 |
| Sc* → $S_A$ | 64 | 62 | 62 | 66 | 62 | 63 | 62 | 60 | 61 |
| $S_A$ → N* | 83 | 85 | 88 | 93 | 82 | 80 | 82 | 73 | 85 |
| N* → $I_{SO}$ | 93 | 92 | 96 | 95 | 93 | 90 | 90 | 91 | 89 |
| Spontaneous polarization value**) (nC/cm²) | 14 | 13 | 11 | 23 | 16 | 24 | 25 | 5 | 35 |
| Tilt angle**) (°) | 21 | 20 | 20 | 21 | 21 | 24 | 23 | 18 | 25 |
| Helical pitch (μm) | | | | | | | | | |
| N* phase***) | 9 | 10 | 13 | 15 | 9 | 28 | 35 | 8 | 7 |
| Sc* phase**) | 7 | 6 | 10 | 10 | 8 | 8 | 10 | 4 | 5 |
| Response time**) (μsec) | 60 | 75 | 90 | 67 | 73 | 80 | 65 | 350 | 100 |

Note:
**)values determined as 25° C.
***)values determined at a temperature of 1° C. higher than the phase transfer temperature $S_A$ → N*

What is claimed is:
1. A ferroelectric liquid crystal composition comprising four components, A, B, C and D, in respective amounts of 75 to 95% by weight, 3 to 9% by weight, 3 to 12% by weight, and 2 to 5% by weight, based on the total amount of the components A, B and C and having a phase sequence series of an isotropic liquid, a cholesteric phase, a smectic A phase and a chiral smectic C phase, proceeding in that order from the high temperature side and a spontaneous polarization value of 30 nC/cm² or less, said component A being at least one compound selected from the group consisting of compounds represented by the general formula (I):

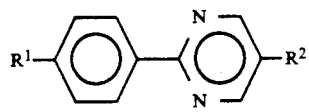
(I)

wherein R¹ and R² which may be the same or different are each a straight-chain or branched alkyl, alkoxy or alkanoyloxy group having 1 to 18 carbon atoms, and compounds represented by the general formula (II)

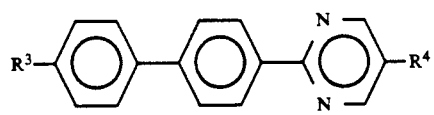
(II)

wherein R³ and R⁴ which may be the same or different, are each a straight-chain or branched alkyl or alkoxy group having 1 to 18 carbon atoms, said component B being at least one compound selected from the group consisting of compounds represented by the general formula (III):

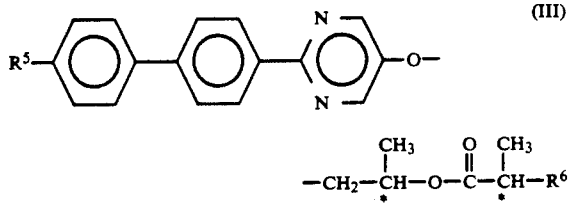
(III)

wherein R⁵ is a straight-chain or branched alkyl or alkoxy group having 1 to 18 carbon atoms, R⁶ is a straight-chain or branched alkyl group having 2 to 18 carbon atoms or a straight-chain or branched alkoxy group having 1 to 18 carbon atoms and * represents an asymmetric carbon atom, and compounds represented by the general formula (IV):

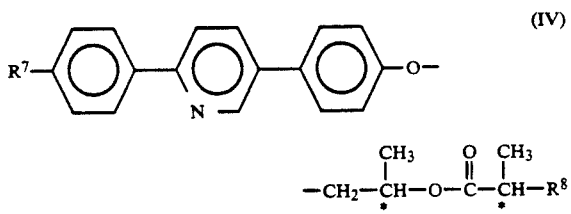
(IV)

wherein R⁷ is a straight-chain or branched alkyl or alkoxy group having 1 to 18 carbon atoms, R⁸ is a straight-chain or branched alkyl group having 2 to 18 carbon atoms or a straight-chain or branched alkoxy group having 1 to 18 carbon atoms and * represents an asymmetric carbon atom, said component C being at least one compound selected from the group consisting of compounds represented by the general formula (V):

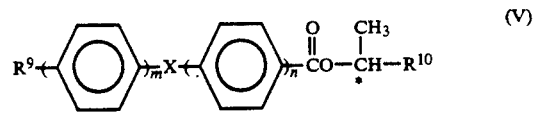
(V)

wherein R⁹ is a straight-chain or branched alkyl or alkoxy group having 1 to 18 carbon atoms, R¹⁰ is a straight-chain or branched alkyl group having 2 to 18 atoms, X is —OCH₂— or —CH₂O—, m and n are each 1 or 2, provided that M+n=3 and * represents an asymmetric carbon atom, said component D being at least one compound selected from the group consisting of compounds represented by the general formula (VI):

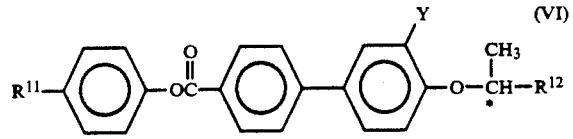
(VI)

wherein R¹¹ is a straight-chain or branched alkyl or alkoxy group having 1 to 18 carbon atoms, R¹² is a straight-chain or branched alkyl group having 2 to 18 carbon atoms, Y is a cyano group or a halogen atom and * represents as asymmetric carbon atom, and compounds represented by the general formula (VII):

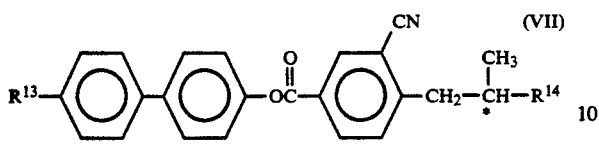

wherein $R^{13}$ is a straight-chain or branched alkyl or alkoxy group having 1 to 18 carbon atoms, $R^{14}$ is a straight-chain or branched alkyl group having 2 to 18 carbon atoms and * represents an asymmetric carbon atom.

2. A ferroelectric liquid crystal composition according to claim 1, wherein said component A is at least one compound selected from the group consisting of compounds represented by the general formula (I) wherein $R^1$ is a straight-chain alkoxy or alkanoyloxy group having 5 to 12 carbon atoms and $R^2$ is a straight-chain alkyl group having 7 to 11 carbon atoms; and compounds represents by the general formula (II) wherein $R^3$ is a straight-chain alkyl or alkoxy group having 5 to 10 carbon atoms and $R^4$ is a straight-chain alkyl group having 6 to 10 carbon atoms.

3. A ferroelectric liquid crystal composition according to claim 1, wherein said component B is at least one compound selected from the group consisting of compounds represented by the general formula (III) wherein $R^5$ is a straight-chain alkyl or alkoxy group having 3 to 10 carbon atoms, $R^6$ is a straight-chain alkyl or alkoxy group having 2 to 10 carbon atoms; and compounds represented by the general formula (IV) wherein $R^7$ is a straight chain alkyl or alkoxy group having 3 to 10 carbon atoms and $R^8$ is a straight-chain alkyl or alkoxy group having 2 to 10 carbon atoms.

4. A ferroelectric liquid crystal composition according to claim 1, wherein said component C is at least one compound selected from the group consisting of compounds represented by the general formula (V) wherein $R^9$ is a straight-chain alkyl or alkoxy group having 6 to 12 carbon atoms and $R^{10}$ is a straight-chain alkyl group having 2 to 10 carbon atoms.

5. A ferroelectric liquid crystal composition according to claim 1, wherein said component A is at least one compound selected from the group consisting of the following compounds:

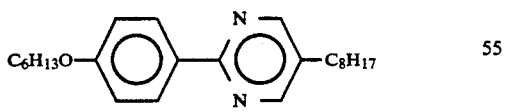

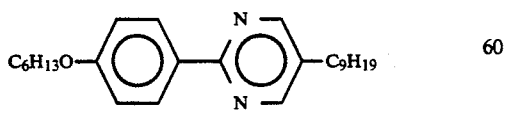

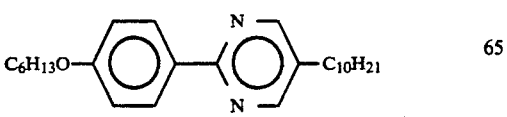

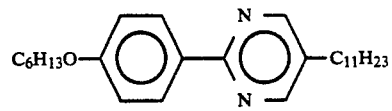

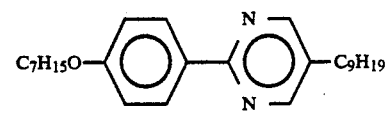

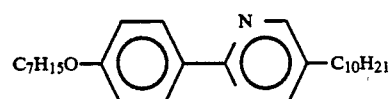

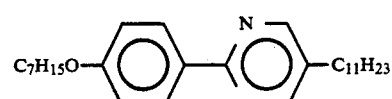

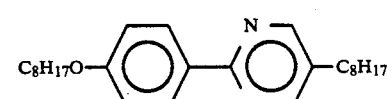

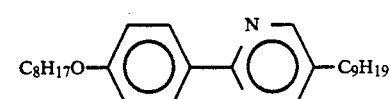

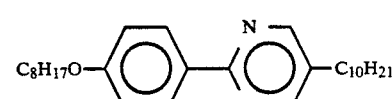

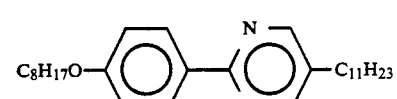

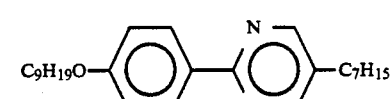

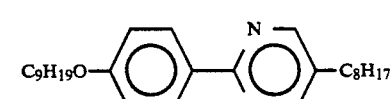

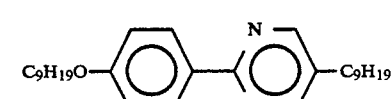

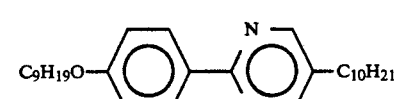

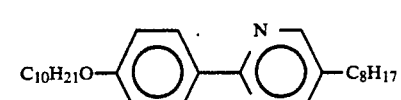

-continued
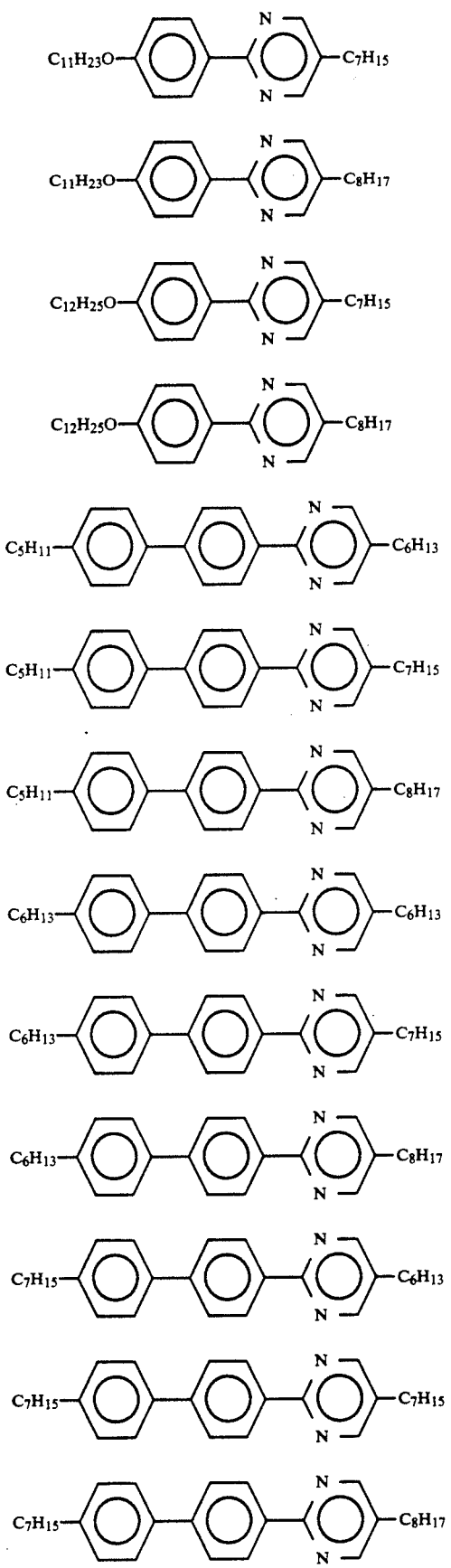
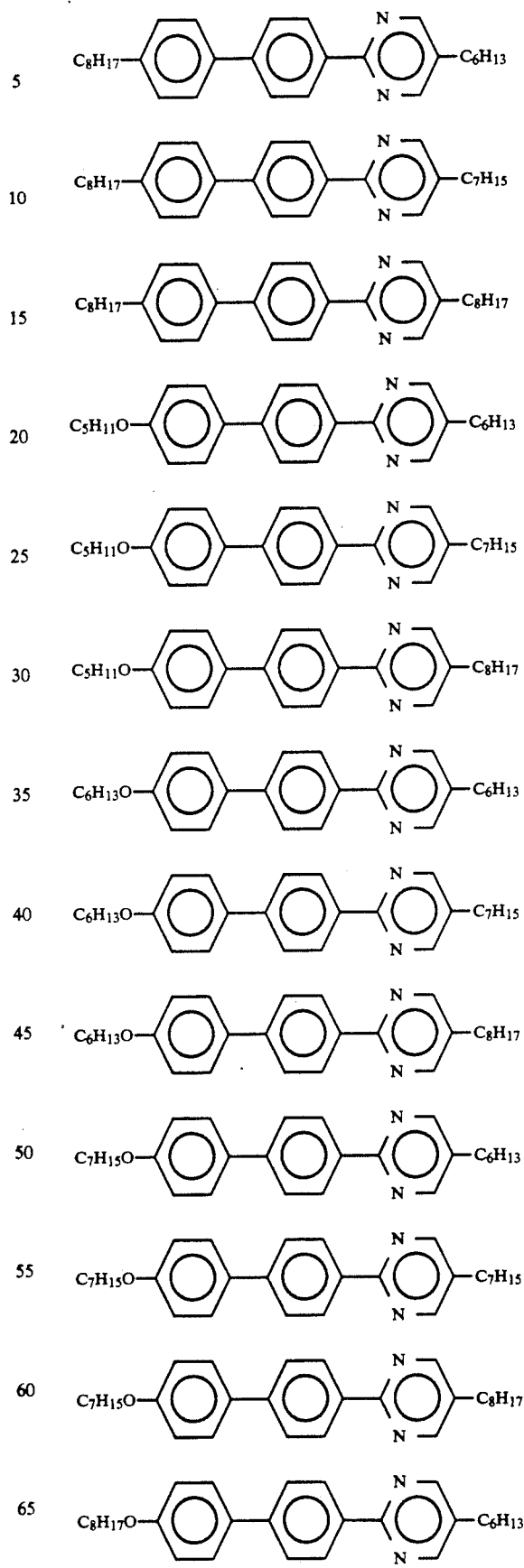

41
-continued
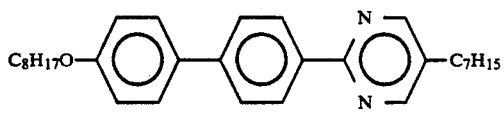
42
-continued
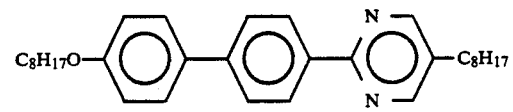
6. A ferroelectric liquid crystal composition according to claim 1, wherein said component B is at least one compound selected from the group consisting of the following compounds:
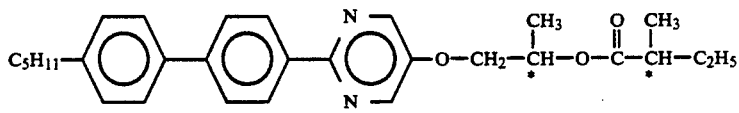
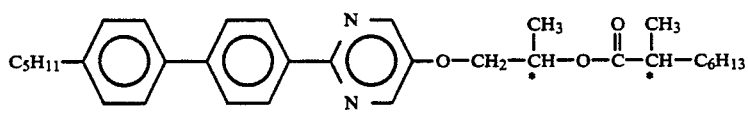
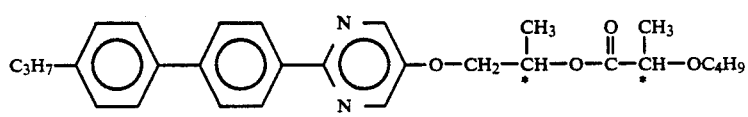
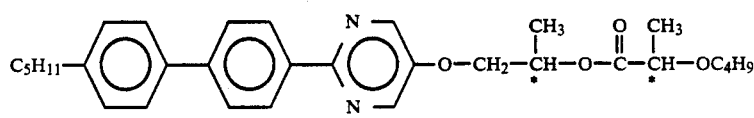
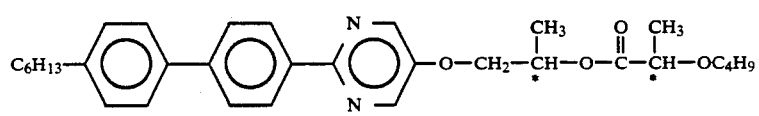
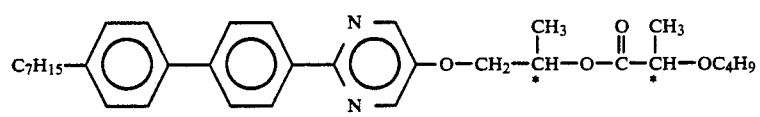
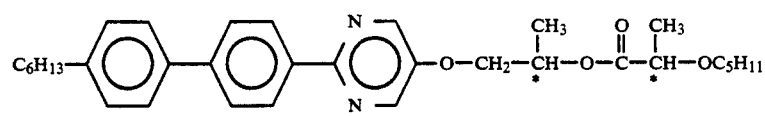
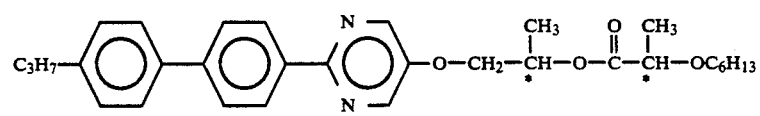
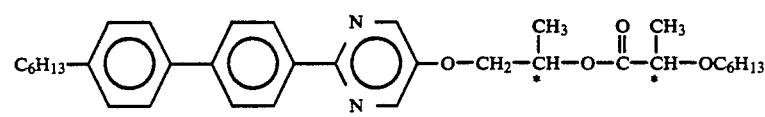
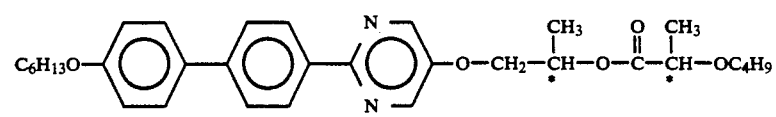
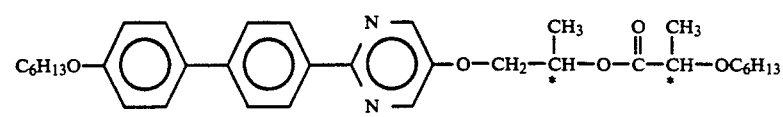

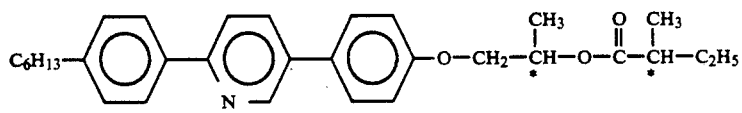
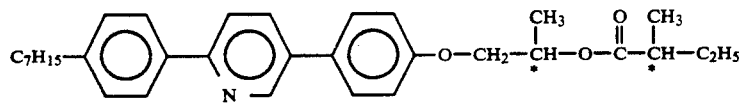
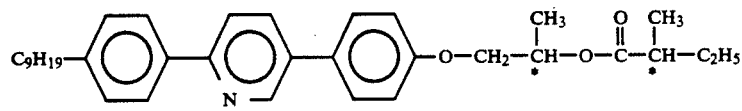
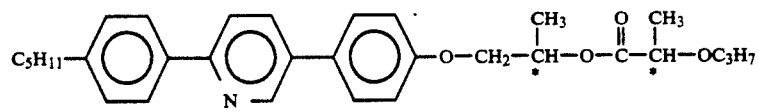
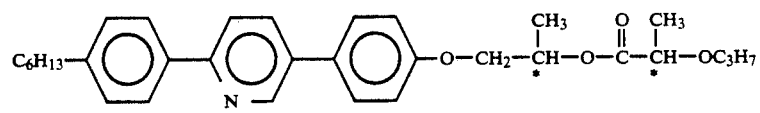
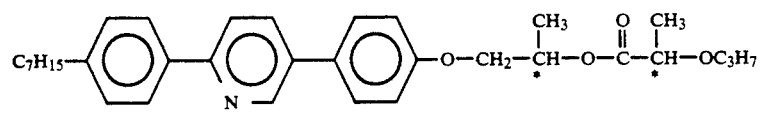
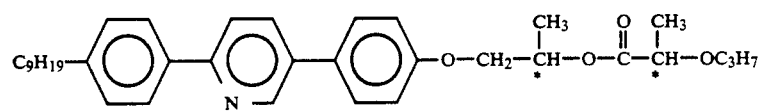
7. A ferroelectric liquid crystal composition according to claim 1, wherein said component C is at lest one compound selected from the group consisting of the following compounds:
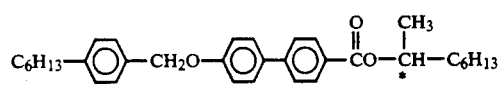
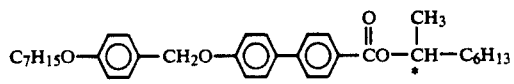
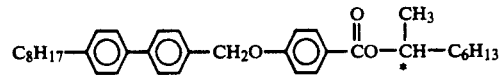
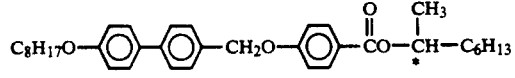
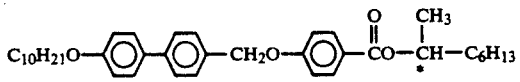
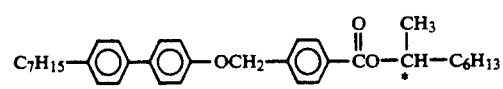
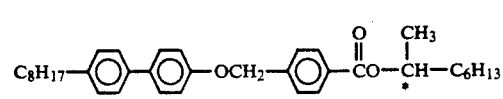
-continued
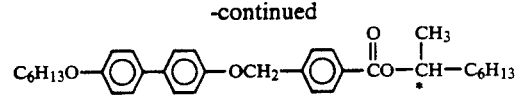
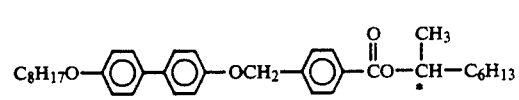
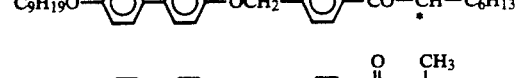
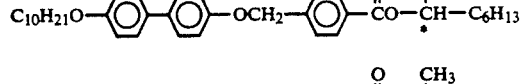
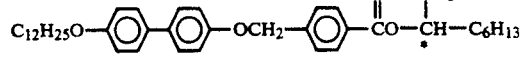
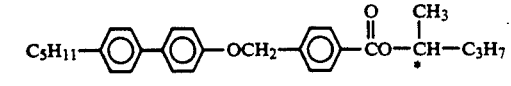
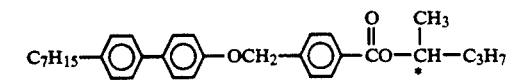

-continued

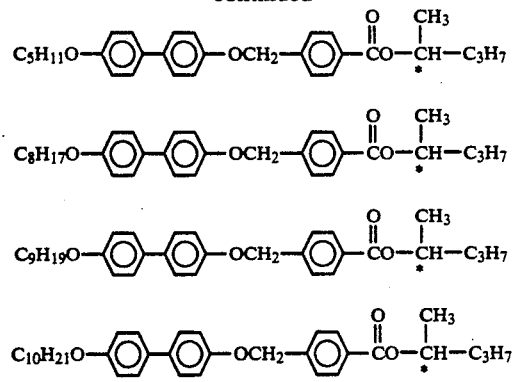

8. A ferroelectric liquid crystal composition according to claim 1, wherein said component D is at least one compound selected from the group consisting of compounds represented by the general formula (VI) wherein $R^{11}$ is a straight-chain alkyl or alkoxy group having 5 to 12 carbon atoms, $R^{12}$ is a straight-chain alkyl group having 2 to 10 carbon atoms and Y is —CN or —F; and compounds represented by the general formula (VII) wherein $R^{13}$ is a straight-chain alkyl or alkoxy group having 5 to 12 carbon atoms and $R^{14}$ is a straight-chain alkyl group having 2 to 10 carbon atoms.

9. A ferroelectric liquid crystal composition according to claim 1, wherein said component D is at least one compound selected from the group consisting of the following compounds:

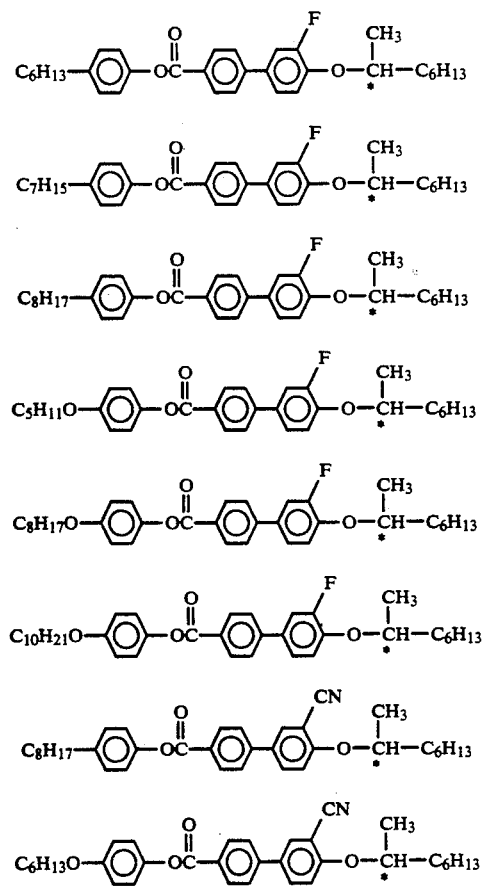

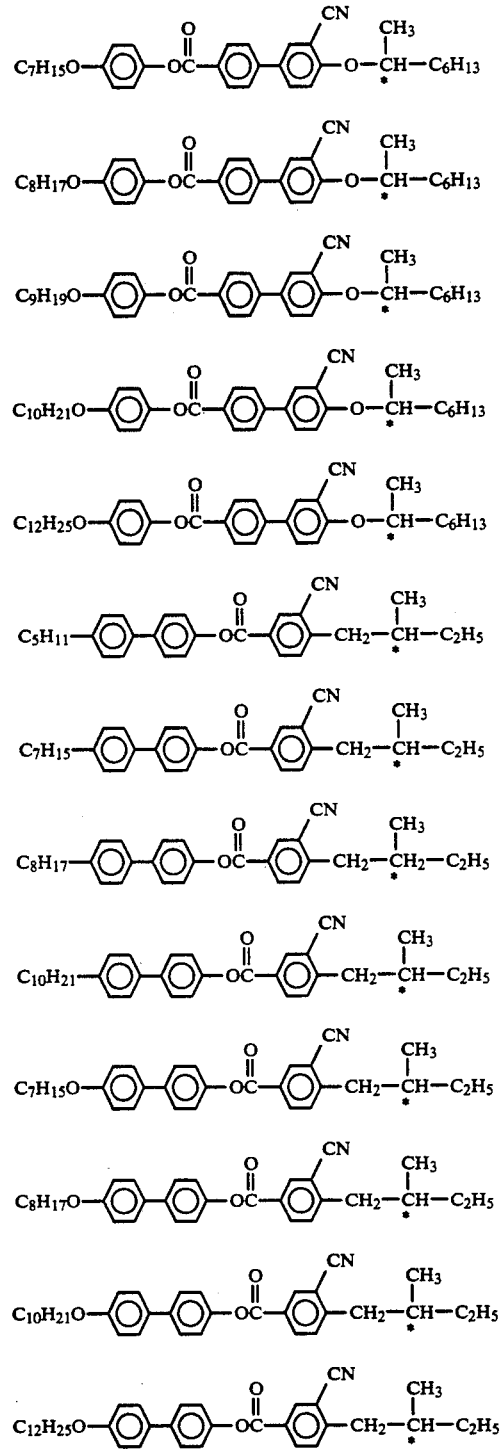

10. An optical switching element comprising a ferroelectric liquid crystal composition according to claim 2.

11. An optical switching element comprising a ferroelectric liquid crystal composition according to claim 3.

12. An optical switching element comprising a ferroelectric liquid crystal composition according to claim 4.

13. An optical switching element comprising a ferroelectric liquid crystal composition according to claim 5.

14. An optical switching element comprising a ferroelectric liquid crystal composition according to claim 6.

15. An optical switching element comprising a ferroelectric liquid crystal composition according to claim 7.

16. An optical switching element comprising a ferroelectric liquid crystal composition according to claim 8.

17. An optical switching element comprising a ferroelectric liquid crystal composition according to claim 9.

18. A ferroelectric liquid crystal composition according to claim 1 wherein said composition has a response time of no higher than about 90 μsec.

19. An optical switching element comprising a ferroelectric liquid crystal composition according to claim 1.

* * * * *